(12) United States Patent
Huang et al.

(10) Patent No.: US 9,532,297 B2
(45) Date of Patent: Dec. 27, 2016

(54) SOFTWARE DEFINED NETWORK AND MOBILITY MANAGEMENT METHOD AND CONTROLLER THEREOF

(71) Applicant: Industrial Technology Research Institute, Hsinchu (TW)

(72) Inventors: Kuei-Li Huang, Kaohsiung (TW); Chai-Hien Gan, Hsinchu (TW); Chia-Lung Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 166 days.

(21) Appl. No.: 14/555,695

(22) Filed: Nov. 28, 2014

(65) Prior Publication Data

US 2016/0135111 A1    May 12, 2016

(30) Foreign Application Priority Data

Nov. 6, 2014   (TW) .............................. 103138541 A (51) Int. Cl.
*H04W 40/24*    (2009.01)
*H04W 76/02*    (2009.01)
*H04W 28/16*    (2009.01)

(52) U.S. Cl.
CPC ........... *H04W 40/246* (2013.01); *H04W 28/16* (2013.01); *H04W 76/023* (2013.01)

(58) Field of Classification Search
CPC .... H04W 40/246; H04W 28/16; H04W 48/16; H04W 28/0226; H04W 28/02; H04W 40/34; H04W 40/36; H04W 72/10; H04W 72/1242; H04W 72/1247; H04W 36/00; H04W 36/0005; H04W 36/0016; H04W 52/281; H04W 40/04; H04W 40/12; H04W 36/0011; H04L 47/10; H04L 45/42; H04L 45/566; H04L 47/30; H04L 47/2441

See application file for complete search history.

(56) References Cited

U.S. PATENT DOCUMENTS

| 8,184,588 B2 | 5/2012 | Park et al. |
| 8,670,407 B2 | 3/2014 | Dutta et al. |
| 2008/0285518 A1 | 11/2008 | Dutta et al. |

(Continued)

FOREIGN PATENT DOCUMENTS

| CN | 103401794 | 11/2013 |
| CN | 103731901 | 4/2014 |

OTHER PUBLICATIONS

Shantidev Mohanty, et al., "A Cross-Layer (Layer 2+3) Handoff Management Protocol for Next-Generation Wireless Systems," IEEE Transactions on Mobile Computing, vol. 5, No. 10, Oct. 2006, pp. 1347-pp. 1360.

(Continued)

*Primary Examiner* — Charles C Jiang
*Assistant Examiner* — Rose Clark
(74) *Attorney, Agent, or Firm* — Jianq Chyun IP Office (57) ABSTRACT

A software defined network (SDN) and a corresponding mobility management method and a corresponding controller are provided. The SDN includes a controller, a plurality of switches and a plurality of edge devices. The controller manages a topology and routing actions of the SDN. When a user equipment (UE) attaches to a target edge device in the edge devices, the target edge device transmits a notification message to the controller. The controller updates flow entries in the switches and the edge devices according to the notification message.

19 Claims, 4 Drawing Sheets

(56) References Cited

U.S. PATENT DOCUMENTS

| | | | |
|---|---|---|---|
| 2012/0252458 A1 | 10/2012 | Ohnishi | |
| 2015/0063144 A1* | 3/2015 | Kozat | H04W 40/12 370/252 |
| 2015/0271710 A1* | 9/2015 | Zhang | H04L 47/20 370/331 |
| 2016/0112903 A1* | 4/2016 | Kaushik | H04W 28/0205 370/235 |
| 2016/0150448 A1* | 5/2016 | Perras | H04W 48/17 455/450 |

OTHER PUBLICATIONS

Ian F. Akyildiz, et al., "A Survey of Mobility Management in Next-Generation All-IP-Based Wireless Systems," IEEE Wireless Communications, vol. 11, Issue 4, Aug. 2004, pp. 16-28.

Nicolas Montavont, et al., "Handover Management for Mobile Nodes in IPv6 Networks," IEEE Communications Magazine, vol. 40, Issue 8, Aug. 2002, pp. 38-43.

R. Koodli, Ed., "Mobile IPv6 Fast Handovers," IETF RFC 5268, Jun. 2008.

S. Gundavelli, Ed. et al., "Proxy Mobile IPv6," IETF RFC 5213, Aug. 2008.

Li Erran Li, et al., "Toward Software-Defined Cellular Networks," 2012 European Workshop on Software Defined Networking (EWSDN), Oct. 25-26, 2012, pp. 7-12.

F. Teraoka, et al., "Unified Layer 2 (L2) Abstractions for Layer 3 (L3)-Driven Fast Handover," IETF RFC 5184, May 2008.

Amin Tootoonchian, et al., "On Controller Performance in Software-Defined Networks," Hot-ICE'12 Proceedings of the 2nd USENIX conference on Hot Topics in Management of Internet, Cloud, and Enterprise Networks and Services, Apr. 2012.

Michiel Appelman, et al., "Performance Analysis of OpenFlow Hardware," Master's thesis, MSC Systems & Network Engineering, University of Amsterdam, Feb. 2012.

X. Marjou, et al., "Application Mechanism for Keeping Alive the NAT Mappings Associated with RTP / RTP Control Protocol (RTCP) Flows," IETF RFC 6263, Jun. 2011.

Kempf et al., "Moving the Mobile evolved Packet Core to the Cloud", 2012 IEEE 8th International Conference on Wireless and Mobile Computing, Networking and Communications (WiMob), Oct. 8-10, 2012, pp. 784-791.

"Office Action of Taiwan Counterpart Application", issued on Apr. 7, 2015, p. 1-p. 7.

* cited by examiner

SOFTWARE DEFINED NETWORK AND MOBILITY MANAGEMENT METHOD AND CONTROLLER THEREOF

CROSS-REFERENCE TO RELATED APPLICATION

This application claims the priority benefit of Taiwan application serial no. 103138541, filed on Nov. 6, 2014. The entirety of the above-mentioned patent application is hereby incorporated by reference herein and made a part of this specification.

BACKGROUND

Technical Field

The disclosure relates to a software defined network (SDN), a mobility management method and a controller thereof.

Related Art

Started From 2012, software defined network (SDN) becomes a hot topic. A difference between the SDN and a conventional network is that a controller is added in the SDN. The controller manages a topology and routing paths of the whole SDN. The controller can dynamically adjust the routing paths according to a real-time status of the network, so as to reduce a network congestion to improve a network performance. The controller and the dynamic routing are characteristics of the SDN.

However, the current SDN is only adapted to cable networks, although a standard-setting organization (the open networking foundation (ONF)) of the SDN has taken wireless networks into consideration, design of the SDN is still not adapted to applications of wireless mobile networks.

If a wireless mobile network system adopts the current design of the SDN, it is assumed that a radio access network (RAN) of the wireless mobile network system is a Wi-Fi network, when a user equipment (UE) is handed over from one access point to another access point, the controller does not immediately adjust flow entries of related switches and access points. After the UE sends the first packet after the handover, the access point attached by the UE sends a standard packet_in message to the controller only when determining that there is no flow entry related to the UE after comparison. Now, the controller sets the flow entries of the related switches and the access points. Before adjustment of the flow entries is completed, the access points and the switches in the SDN cannot route packets for the UE. This period of time that the packets cannot be routed is referred to as a handover delay.

SUMMARY

The disclosure is directed to a software defined network (SDN) supporting mobile services, and a mobility management method and a controller thereof, by which a handover delay caused by flow entry adjustment of the SDN is shortened.

The disclosure provides a software defined network (SDN) supporting mobile services, which includes a controller, a plurality of switches and a plurality of edge devices. The controller manages a topology and routing actions of the SDN. The switches are coupled to the controller. The edge devices are coupled to the controller and the switches. When a user equipment (UE) attaches to a target edge device in the edge devices, the target edge device transmits a notification message to the controller. The controller updates flow entries in the switches and the edge devices according to the notification message.

The disclosure provides a mobility management method adapted to the aforementioned SDN. The mobility management method includes following steps. When a UE attaches to a target edge device in the edge devices, a notification message is sent. Flow entries in the switches and the edge devices are updated according to the notification message.

The disclosure provides a controller managing a topology and routing actions of a SDN. The controller includes a network interface and a processor. The network interface is coupled to the SDN, and transmits and receives packets for the controller. The processor is coupled to the network interface, receives a notification message, and updates flow entries in a plurality of switches and a plurality of edge devices in the SDN according to the notification message. The notification message is transmitted from a target edge device in the edge devices to the controller when a UE attaches to the target edge device.

According to the above description, the aforementioned SDN, the mobility management method and the controller of the disclosure is capable of shortening the handover delay through various technical means, so as to make up a deficiency of the SDN on mobility management support.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
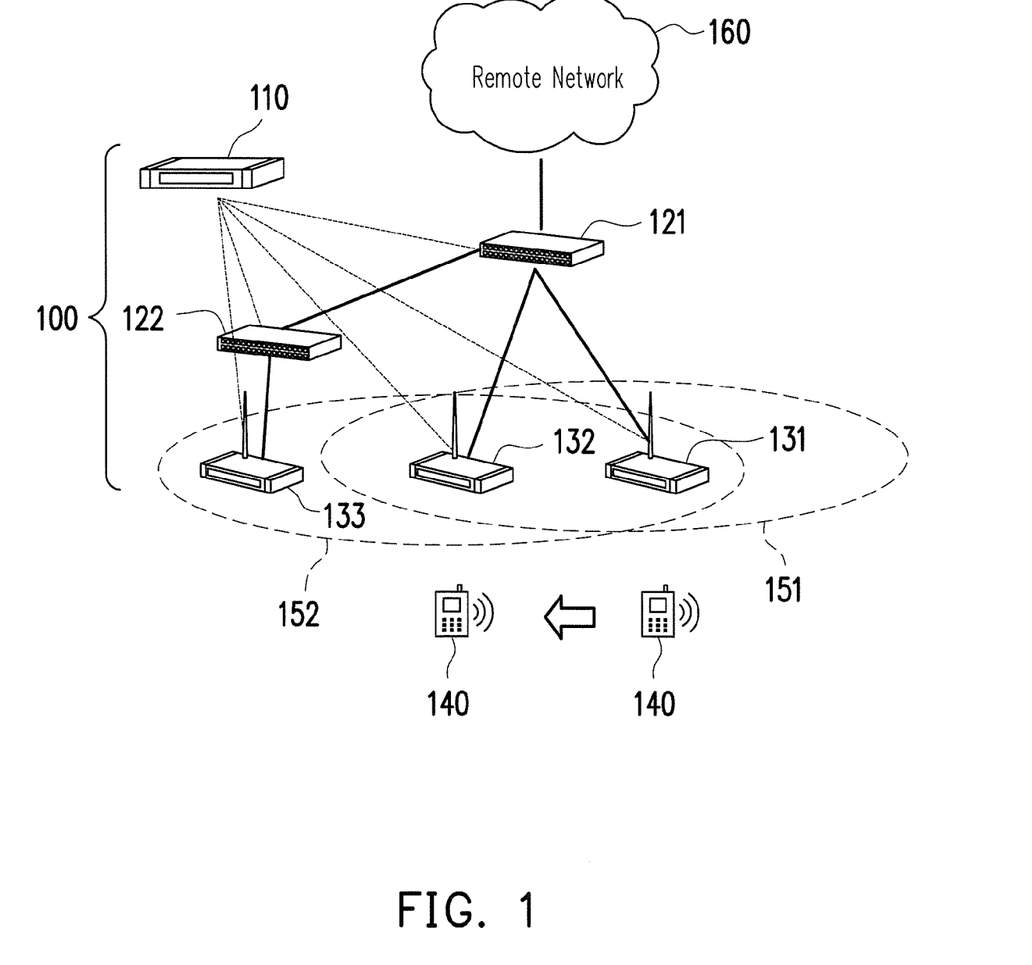
FIG. 1 is a partial schematic diagram of a software defined network (SDN) supporting mobile services according to an embodiment of the disclosure.

FIG. 1 is a partial schematic diagram of a software defined network (SDN) 100 supporting mobile services according to an embodiment of the disclosure. The SDN 100 includes a controller 110, a plurality of switches and a plurality of edge devices. The switches 121-122 are a part of the aforementioned switches. The edge devices 131-133 are a part of the aforementioned edge devices. The switches 121-122 are coupled to the controller 110. The edge devices 131-133 are coupled to the controller 110 and the switches 121-122. The controller 110 manages a topology and routing actions of the SDN 100. Each of the edge devices 131-133 can be a base station or an access point. The edge devices 131-133 can be attached by a user equipment (UE) 140 for accessing a remote network 160. The switches 121-122 can route packets for the UE 140 between the remote network 160 and the edge devices 131-133. The remote network 160 can be the Internet, or a local area network of a company or an organization.

Figure 2:
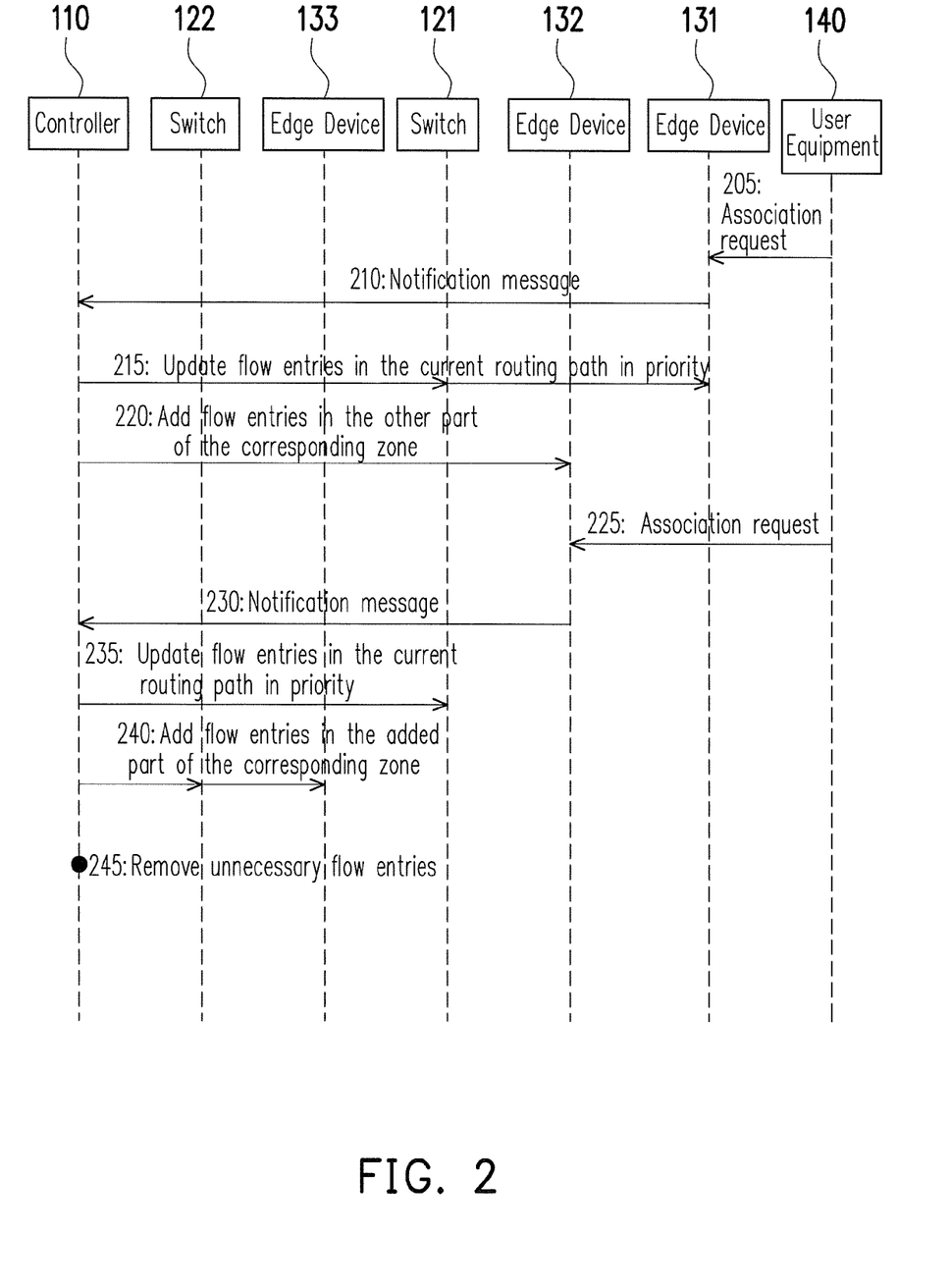
FIG. 2 is a flowchart illustrating a mobility management method of a SDN according to an embodiment of the disclosure.

FIG. 2 is a flowchart illustrating a mobility management method of a SDN according to an embodiment of the disclosure. The mobility management method can be applied to the SDN 100. In step 205, the UE 140 sends an association request to the edge device 131 in order to attach the edge device 131. Such attachment is an initial attachment between the UE 140 and the SDN 100. The edge device which is selected by the UE 140 to attach to is referred to as the target edge device. In step 210, the target edge device 131 transmits a notification message to the controller 110 in response to the association request of the step 205. The controller 110 updates flow entries in the switches and the edge devices of the SDN 100 according to the notification message.

Figure 3:
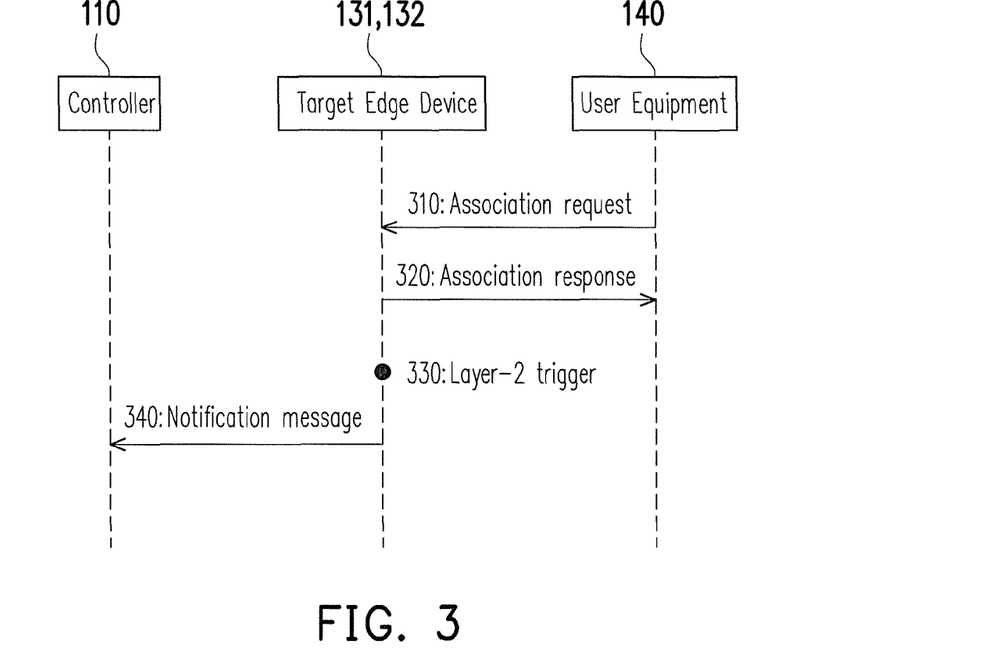
FIG. 3 is a flowchart illustrating a process that a user equipment attaches to a target edge device according to an embodiment of the disclosure.

FIG. 3 is a flowchart illustrating a process that the UE 140 attaches to the target edge device 131 according to an embodiment of the disclosure, i.e., details of the steps 205 and 210. In step 310, the UE 140 transmits the association request to the target edge device 131. The association request of the step 310 is the association request of the step 205. In step 320, the target edge device 131 transmits an association response corresponding to the above association request to the UE 140. In step 330, an SDN module of the target edge device 131 receives a layer-2 trigger caused by the attachment of the UE 140 from a media access control sub-layer. In step 340, the target edge device 131 transmits the notification message related to the attachment of the UE 140 to the controller 110. The notification message of the step 340 is the notification message of the step 210.

Figure 4:
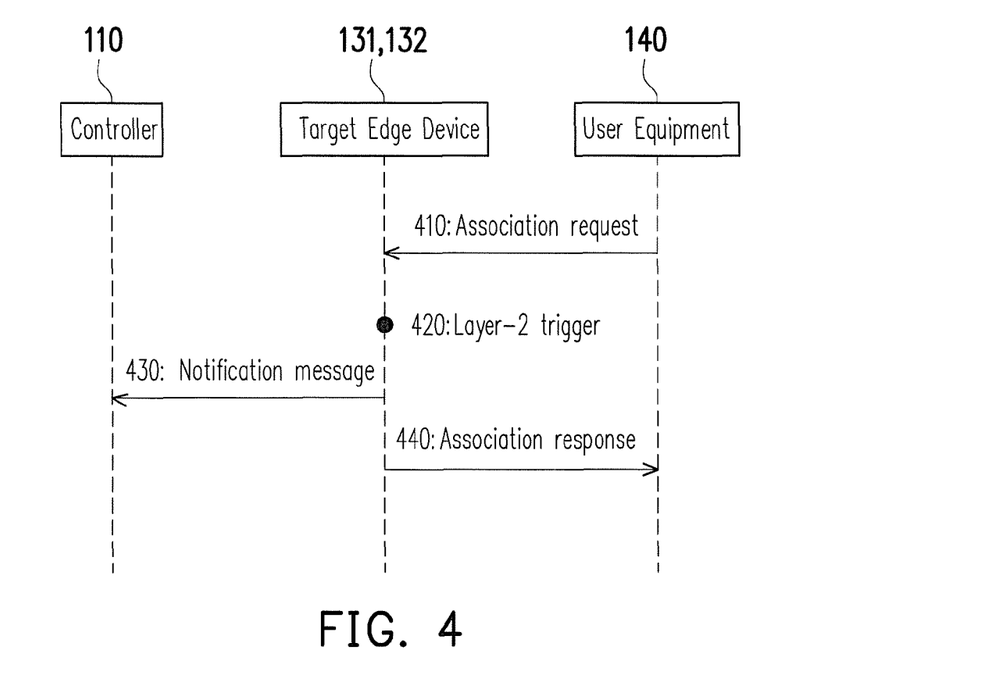
FIG. 4 is a flowchart illustrating a process that a user equipment attaches to a target edge device according to another embodiment of the disclosure.

FIG. 4 is a flowchart illustrating a process that the UE 140 attaches to the target edge device 131 according to another embodiment of the disclosure, i.e., more details of the steps 205 and 210. In step 410, the UE 140 transmits the association request to the target edge device 131. The association request of the step 410 is the association request of the step 205. In step 420, an SDN module of the target edge device 131 receives a layer-2 trigger caused by the attachment of the UE 140 from the media access control sub-layer. In step 430, the target edge device 131 transmits the notification message related to the attachment of the UE 140 to the controller 110. The notification message of the step 430 is the notification message of the step 210. In step 440, the target edge device 131 transmits an association response corresponding to the association request of the step 410 to the UE 140.

A difference between the embodiments of FIG. 3 and FIG. 4 is that in the embodiment of FIG. 3, the target edge device 131 transmits the notification message to the controller 110 after transmitting the association response, while in the embodiment of FIG. 4, the target edge device 131 transmits the notification message to the controller 110 before transmitting the association response, such that the controller 110 can receive the notification message earlier, and can adjust the flow entries in the SDN 100 earlier. In the two embodiments of FIG. 3 and FIG. 4, the target edge device 131 transmits the notification message to the controller 110 before receiving any uplink packet from the UE 140, by which adjustment of the flow entries in the SDN 100 is activated earlier than that of the conventional method.

The association request and the association response in FIG. 3 and FIG. 4 may have a plurality of implementations. For example, if a radio access network (RAN) of the SDN 100 is a Wi-Fi network, the association request of FIG. 3 and FIG. 4 can be an association request frame of a 802.11 standard, and the association response of FIG. 3 and FIG. 4 can be an association response frame of the 802.11 standard. If the SDN 100 adopts other types of the RAN, the association request and the association response of FIG. 3 and FIG. 4 can be replaced by corresponding messages of the other radio communication standards.

Referring back to FIG. 2, in steps 215 and 220, the controller 110 updates flow entries related to the UE 140 in a corresponding zone of the target edge device 131 according to the notification message of the step 210. Regarding each one of the edge devices in the SDN 100, the corresponding zone of the one edge device includes each of the edge devices within a handover range of the one edge device and each of the switches coupled between each of the edge devices within the handover range and the remote network 160. Regarding an edge device, the handover range of the edge device includes the edge device itself and the other nearby edge devices suitable for UE handover. For example, a handover range 151 of the edge device 131 includes the edge devices 131 and 132. A handover range 152 of the edge device 132 includes the edge devices 131-133. The corresponding zones of the edge devices 131-133 are listed in a following table 1. The controller 110 has a related record for each of the edge devices and the corresponding zone thereof.

TABLE 1

| Edge device | Corresponding zone |
| --- | --- |
| 131 | Edge devices 131, 132 and switch 121 |
| 132 | Edge devices 131~133 and switches 121, 122 |
| 133 | Edge devices 132, 133 and switches 121, 122 |

During the updating of the flow entries related to the UE 140 of the step 215 and 220, the controller 110 first updates the flow entries related to the UE 140 in a current routing path in priority in the step 215. The current routing path is defined as a sequence of devices including the target edge device itself and each of the switches coupled between the target edge device and the remote network 160. Therefore, the current routing path corresponding to the target edge device 131 includes the edge device 131 and the switch 121. If the target edge device is the edge device 132, the current routing path includes the edge device 132 and the switch 121. If the target edge device is the edge device 133, the current routing path includes the edge device 133 and the switches 122 and 121.

In the priority updating of the flow entries of the step 215, the controller 110 can set a plurality of downlink flow entries related to the UE 140 in at least one switch of the current routing path. In the downlink flow entries, the downlink flow entry corresponding to the target edge device 131 has a first priority, and each of the other downlink flow entries has a second priority. The first priority is superior to the second priority.

After the priority updating of the flow entries of the step 215 is completed, in the step 220, the controller 110 adds flow entries related to the UE 140 in the other part of the corresponding zone 151 of the target edge device 131. The so-called other part refers to the edge devices and the switches belonging to the corresponding zone 151 of the target edge device 131 and not belonging to the current routing path. Regarding the target edge device 131, the other part refers to the edge device 132. In following table 2 to table 4, the flow entries set by the controller 110 in the steps 215 and 220 are listed.

TABLE 2 flow entry table of the switch 121

| I/O port | Packet source | Packet destination | Routing actions | Priority |
|---|---|---|---|---|
| p_160 | * | UE 140 | Output to p_131 | 0 (high) |
| p_160 | * | UE 140 | Output to p_132 | 7 (low) |
| p_131 | UE 140 | * | Output to p_160 | |
| p_132 | UE 140 | * | Output to p_160 | |

TABLE 3 flow entry table of the edge device 131

| I/O port | Packet source | Packet destination | Routing actions |
|---|---|---|---|
| p_140 | UE 140 | * | Output to p_121 |
| p_121 | * | UE 140 | Output to p_140 |

TABLE 4 flow entry table of the edge device 132

| I/O port | Packet source | Packet destination | Routing actions |
|---|---|---|---|
| p_140 | UE 140 | * | Output to p_121 |
| p_121 | * | UE 140 | Output to p_140 |

In the table 2, p_131, p_132 and p_160 are all input/output (I/O) ports of the switch 121, where p_131 and p_132 are respectively the I/O ports coupled to the edge devices 131 and 132, and p_160 is the I/O port coupled to the remote network 160. In the table 3, p_121 and p_140 are I/O ports of the edge device 131, where p_121 is the I/O port coupled to the switch 121, and p_140 is the I/O port coupled to the UE 140. In the table 4, p_121 and p_140 are I/O ports of the edge device 132, where p_121 is the I/O port coupled to the switch 121, and p_140 is the I/O port coupled to the UE 140. "*" in the table 2 to table 4 refers to any network address.

In the step 215, the controller 110 sets the flow entries of the table 2 and the table 3 in priority. As shown in the table 2, the controller 110 sets two uplink flow entries and two downlink flow entries to the switch 121. The two uplink flow entries of the table 2 respectively correspond to the edge devices 131 and 132. The two downlink flow entries of the table 2 also correspond to the edge devices 131 and 132, respectively. Since the UE 140 is now attached to the target edge device 131 other than the edge device 132, the downlink flow entry corresponding to the target edge device 131 has higher priority. Due to the higher priority, the switch 121 outputs a downlink packet belonging to the UE 140 to the edge device 131 other than outputting the same to the edge device 132.

As shown in the table 3, the controller 110 sets an uplink flow entry and a downlink flow entry to the edge device 131. After the controller 110 updates the flow entries of the table 2 and the table 3 in priority in the step 215, the edge device 131 and the switch 121 start to route packets for the UE 140 without waiting for the updating of the other flow entries. Then, the controller 110 sets the flow entries of the table 4 in the step 220. As shown in the table 4, the controller 110 adds an uplink flow entry and a downlink flow entry to the edge device 132. The flow entries of the table 3 and the table 4 are the same.

Then, the UE 140 is handed over from the edge device 131 to the edge device 132. The edge device 131 is referred to as a source edge device, and the edge device 132 is a referred to as a target edge device. In step 225, the UE 140 transmits an association request to the edge device 132. In step 230, the edge device 132 transmits a notification message related to the attachment of the UE 140 to the controller 110. Details of the steps 225 and 230 are also as that shown in FIG. 3 or FIG. 4. Since the attachment of the UE 140 is for handover and is not the initial attachment, the association request and the association response in FIG. 3 and FIG. 4 can be different to that of the aforementioned embodiment. For example, if the RAN of the SDN 100 is the Wi-Fi network, the association request in FIG. 3 and FIG. 4 can be a reassociation request frame of the 802.11 standard, and the association response of FIG. 3 and FIG. 4 can be a reassociation response frame of the 802.11 standard. If the SDN 100 adopts other types of the RAN, the association request and the association response of FIG. 3 and FIG. 4 can be replaced by corresponding messages of the other radio communication standards.

Then, in steps 235, 240 and 245, the controller 110 updates the flow entries related to the UE 140 according to the notification message of the step 230. During the updating of the flow entries related to the UE 140, the controller 110 first updates the flow entries related to the UE 140 in a current routing path in priority in the step 235. In the current routing path corresponding to the target edge device 132, at least one switch probably has a plurality of downlink flow entries of different priorities. In the priority updating of the flow entries of the step 235, the controller 110 can exchange the priorities of the downlink flow entry corresponding to the source edge device 131 and the downlink flow entry corresponding to the target edge device 132 in at least one switch of the current routing path.

After the priority updating of the flow entries of the step 235 is completed, in step 240, the controller 110 adds flow entries related to the UE 140 in an added part of the corresponding zone. The so-called added part refers to the edge devices and the switches belonging to the corresponding zone 152 of the target edge device 132 and not belonging to the corresponding zone 151 of the source edge device 131. Namely, the controller 110 adds flow entries related to the UE 140 in the switch 122 and the edge device 133.

After the step 240 of the adding the flow entries, in step 245, the flow entries that become invalid due to the handover are removed. A general rule is that the controller 110 removes the flow entries related to the UE 140 in the edge devices and the switches belonging to the corresponding zone of the source edge device and not belonging to the corresponding zone of the target edge device. However, regarding the handover from the edge device 131 to the edge device 132, the edge device and switch belonging to the corresponding zone 151 and not belonging to the corresponding zone 152 do not exist, so that execution of the step 245 is unnecessary. In case of the handover from the edge device 132 to the edge device 131, since the edge device 131 belongs to the corresponding zone of the source edge device 132 and does not belong to the corresponding zone of the target edge device 133, in the step 245, the controller 110 removes the flow entries related to the UE 140 in the edge device 131. Following tables 5-7 list the flow entries updated by the controller 110 in the steps 235 and 240.

TABLE 5 flow entry table of the switch 121

| I/O port | Packet source | Packet destination | Routing actions | Priority |
|---|---|---|---|---|
| p_160 | * | UE 140 | Output to p_131 | 7 (low) |
| p_160 | * | UE 140 | Output to p_132 | 0 (high) |
| p_131 | UE 140 | * | Output to p_160 | |
| p_132 | UE 140 | * | Output to p_160 | |

TABLE 6 flow entry table of the edge device 131

| I/O port | Packet source | Packet destination | Routing actions |
|---|---|---|---|
| p_140 | UE 140 | * | Output to p_122 |
| p_122 | * | UE 140 | Output to p_140 |

TABLE 7 flow entry table of the switch 122

| I/O port | Packet source | Packet destination | Routing actions | Priority |
|---|---|---|---|---|
| p_121 | * | UE 140 | Output to p_133 | |
| p_133 | UE 140 | * | Output to p_121 | |

In the table 6, p_122 and p_140 are all I/O ports of the edge device 133, where p_122 is the I/O port coupled to the switch 122, and p_140 is the I/O port coupled to the UE 140. In the table 7, p_121 and p_133 are I/O ports of the switch 121, where p_121 is the I/O port coupled to the switch 121, and p_133 is the I/O port coupled to the edge device 133.

In the step 235, the controller 110 updates the flow entries related to the UE 140 in the current routing path in priority. In fact, the updating performed by the controller 110 in the step 235 is only to exchange the priorities of the two downlink flow entries related to the UE 140 in the switch 121. The other parts of the table 2 and the table 5 are the same. Since the UE 140 is now attached to the target edge device 132 other than the source edge device 131, the downlink flow entry corresponding to the target edge device 132 has higher priority. Due to the higher priority, the switch 121 outputs a downlink packet belonging to the UE 140 to the target edge device 132 other than outputting the same to the source edge device 131.

The flow entries of the edge devices 131 and 132 are unnecessary to be changed, and are still as that shown in the table 3 and the table 4. After the controller 110 updates the flow entries of the table 5 in priority in the step 235, the edge device 132 and the switch 121 start to route packets for the UE 140 without waiting for the updating of the other flow entries.

Then, in the step 240, the controller 110 sets the flow entries of the table 6 and the table 7. As shown in the table 6, the controller 110 sets an uplink flow entry and a downlink flow entry in the edge device 133. As shown in the table 7, the controller 110 sets an uplink flow entry and a downlink flow entry in the switch 122.

Figure 5:
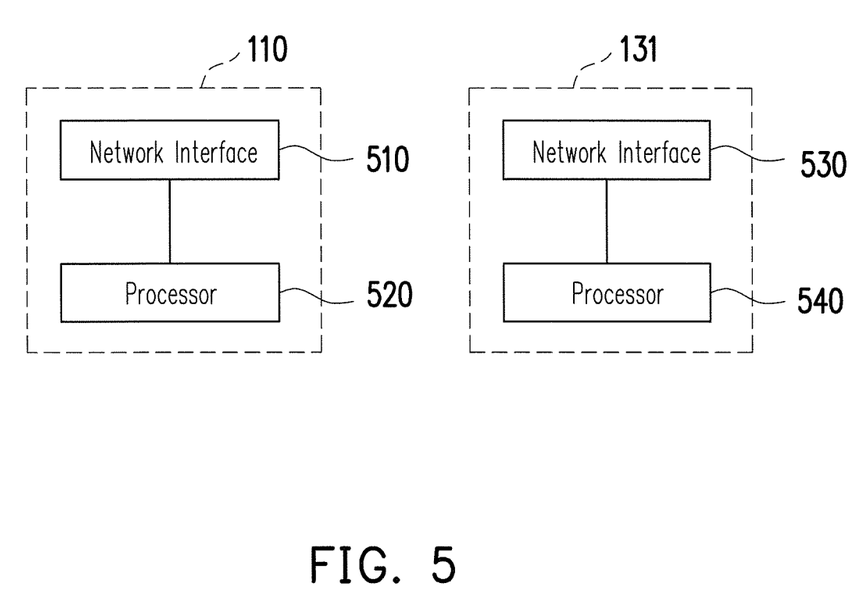
FIG. 5 is a schematic diagram of a controller and an edge device according to an embodiment of the disclosure.

FIG. 5 is a schematic diagram of the controller 110 and the edge device 131 according to an embodiment of the disclosure. The controller 110 includes a network interface 510 and a processor 520. The network interface 510 is coupled to the SDN 100, and transmits and receives packets for the controller 110. In the aforementioned embodiments, all of data and information transmitted and received by the controller 110 are performed through the network interface 510. The processor 520 is coupled to the network interface 510. In the aforementioned method flow, the steps executed by the controller 110 are all executed by the processor 520.

The edge device 131 includes a network interface 530 and a processor 540. The network interface 530 is coupled to the SDN 100, and transmits and receives packets for the edge device 131. In the aforementioned embodiments, all of data and information transmitted and received by the edge device 131 are performed through the network interface 530. The processor 540 is coupled to the network interface 530. In the aforementioned method flow, the steps executed by the edge device 131 are all executed by the processor 540. Structures of the other edge devices 132 and 133 are all the same to that of the edge device 131.

In summary, the aforementioned layer-2 trigger mechanism can quickly activate updating of the flow entries in the SDN. The corresponding zones and switch of the priorities of the downlink flow entries can reduce an amount control information sent by the controller after the handover. Priority updating of the flow entries in the current routing path makes the switches and the edge devices of the current routing path to route packets for the UE in a faster way. Therefore, the SDN, the mobility management method and the controller can largely shorten the handover delay of the SDN, and make up a deficiency of the SDN on mobility management support.

What is claimed is:

1. A software defined network supporting mobile services, comprising:
    a controller, configured to manage a topology and routing actions of the software defined network;
    a plurality of switches, coupled to the controller; and
    a plurality of edge devices, coupled to the controller and the switches, wherein when a user equipment attaches to a target edge device in the edge devices, the target edge device transmits a notification message to the controller, and the controller updates flow entries in the switches and the edge devices according to the notification message,
    wherein the controller updates flow entries related to the user equipment in a corresponding zone of the target edge device according to the notification message; for each one of the edge devices, a corresponding zone of the one edge device comprises each of the edge devices within a handover range of the one edge device and each of the switches coupled between each of the edge devices within the handover range and a remote network,
    wherein in the updating of the flow entries related to the user equipment, the controller updates in priority the flow entries related to the user equipment in a current routing path, the current routing path comprises the target edge device and each of the switches coupled between the target edge device and the remote network.

2. The software defined network as claimed in claim 1, wherein the target edge device transmits the notification message to the controller before receiving any uplink packet of the user equipment.

3. The software defined network as claimed in claim 2, wherein the target edge device transmits the notification message to the controller after transmitting an association response to the user equipment.

4. The software defined network as claimed in claim 2, wherein the target edge device transmits the notification message to the controller before transmitting an association response to the user equipment.

5. The software defined network as claimed in claim 1, wherein when the user equipment attaches to the target edge device due to an initial attachment with the software defined network, in the priority updating of the flow entries, the controller sets a plurality of downlink flow entries related to the user equipment in at least one switch of the current routing path, one of the downlink flow entries corresponding to the target edge device has a first priority, and each of the other downlink flow entries has a second priority, and the first priority is superior to the second priority.

6. The software defined network as claimed in claim 5, wherein after the priority updating of the flow entries is completed, the controller adds flow entries related to the user equipment in the edge devices and the switches belonging to the corresponding zone of the target edge device and not belonging to the current routing path.

7. The software defined network as claimed in claim 5, wherein when the user equipment attaches to the target edge device due to a handover from a source edge device in the edge devices to the target edge device, in the priority updating of the flow entries, the controller exchanges priorities of the downlink flow entry corresponding to the source edge device and the downlink flow entry corresponding to the target edge device in the at least one switch of the current routing path.

8. The software defined network as claimed in claim 7, wherein after the priority updating of the flow entries is completed, the controller adds flow entries related to the user equipment in the edge devices and the switches belonging to the corresponding zone of the target edge device and not belonging to the corresponding zone of the source edge device.

9. The software defined network as claimed in claim 8, wherein after the adding of the flow entries related to the user equipment, the controller removes the flow entries related to the user equipment in the edge devices and the switches belonging to the corresponding zone of the source edge device and not belonging to the corresponding zone of the target edge device.

10. A mobility management method for a software defined network, wherein the software defined network comprises a plurality of switches and a plurality of edge devices, the mobility management method comprising:
transmitting a notification message when a user equipment attaches to a target edge device in the edge devices;
updating flow entries in the switches and the edge devices according to the notification message;
updating flow entries related to the user equipment in a corresponding zone of the target edge device according to the notification message, wherein for each one of the edge devices, a corresponding zone of the one edge device comprises each of the edge devices within a handover range of the one edge device and each of the switches coupled between each of the edge devices within the handover range and a remote network; and
in the updating of the flow entries related to the user equipment, updating in priority the flow entries related to the user equipment in a current routing path, wherein the current routing path comprises the target edge device and each of the switches coupled between the target edge device and the remote network.

11. The mobility management method as claimed in claim 10, further comprising:
transmitting the notification message before the target edge device receives any uplink packet of the user equipment.

12. The mobility management method as claimed in claim 11, further comprising:
transmitting the notification message after transmitting an association response to the user equipment.

13. The mobility management method as claimed in claim 11, further comprising:
transmitting the notification message before transmitting an association response to the user equipment.

14. The mobility management method as claimed in claim 10, wherein when the user equipment attaches to the target edge device due to an initial attachment with the software defined network, the mobility management method further comprises:
in the priority updating of the flow entries, setting a plurality of downlink flow entries related to the user equipment in at least one switch of the current routing path, wherein one of the downlink flow entries corresponding to the target edge device has a first priority, and each of the other downlink flow entries has a second priority, and the first priority is superior to the second priority.

15. The mobility management method as claimed in claim 14, further comprising:
after the priority updating of the flow entries is completed, adding flow entries related to the user equipment in the edge devices and the switches belonging to the corresponding zone of the target edge device and not belonging to the current routing path.

16. The mobility management method as claimed in claim 14, wherein when the user equipment attaches to the target edge device due to a handover from a source edge device in the edge devices to the target edge device, the mobility management method further comprises:
in the priority updating of the flow entries, exchanging priorities of the downlink flow entry corresponding to the source edge device and the downlink flow entry corresponding to the target edge device in the at least one switch of the current routing path.

17. The mobility management method as claimed in claim 16, further comprising:
after the priority updating of the flow entries is completed, adding flow entries related to the user equipment in the edge devices and the switches belonging to the corresponding zone of the target edge device and not belonging to the corresponding zone of the source edge device.

18. The mobility management method as claimed in claim 17, further comprising:
after the adding of the flow entries related to the user equipment, removing the flow entries related to the user equipment in the edge devices and the switches belonging to the corresponding zone of the source edge device and not belonging to the corresponding zone of the target edge device.

19. A controller, configured to manage a topology and routing actions of a software defined network, and comprising:
a network interface, coupled to the software defined network, and transmitting and receiving packets for the controller; and
a processor, coupled to the network interface, receiving a notification message, and updating flow entries in a plurality of switches and a plurality of edge devices in the software defined network according to the notification message, wherein the notification message is transmitted from a target edge device in the edge devices to the controller when a user equipment attaches to the target edge device, wherein the controller updates flow entries related to the user equipment in a corresponding zone of the target edge device according to the notification message; for each one of the edge devices, a corresponding zone of the one edge device comprises each of the edge devices within a handover range of the one edge device and each of the switches coupled between each of the edge devices within the handover range and a remote network, wherein in the updating of the flow entries related to the user equipment, the controller updates in priority the flow entries related to the user equipment in a current routing path, the current routing path comprises the target edge device and each of the switches coupled between the target edge device and the remote network.

* * * * *